United States Patent [19]
Golden

[11] Patent Number: 4,580,505
[45] Date of Patent: Apr. 8, 1986

[54] METHODS AND APPARATUS OF FLUIDIZED BEDS INVOLVING HEAT OR COMBUSTION

[76] Inventor: James R. Golden, 4515 Westover Ter., Knoxville, Tenn. 37914

[21] Appl. No.: 576,366

[22] Filed: Feb. 2, 1984

[51] Int. Cl.$^4$ .............................................. F23L 15/00
[52] U.S. Cl. .................................... 110/302; 110/245; 110/347; 431/7; 431/167
[58] Field of Search ............... 122/4 D; 110/245, 263, 110/347, 302; 431/167, 7, 170; 165/104.16

[56] References Cited

U.S. PATENT DOCUMENTS

| | | | |
|---|---|---|---|
| 3,194,215 | 7/1965 | Barnes | 431/167 X |
| 3,244,220 | 4/1966 | Kloecker | 431/167 |
| 4,168,670 | 9/1979 | Wall et al. | 110/245 X |

*Primary Examiner*—Edward G. Favors

[57] ABSTRACT

An improvement in method and apparatus of fluidized beds involving heat or combustion by pre-heating the exterior and interior of the fluidized bed in unison through the use of an exterior chamber surrounding the fluidized bed chamber. This exterior chamber also provides equalization of fluidizing gas temperature with internal fluid bed temperatures during operation of the bed and allows for a scaling down of the fluidized bed to a small size without sacrificing high efficiency.

8 Claims, 2 Drawing Figures

METHODS AND APPARATUS OF FLUIDIZED BEDS INVOLVING HEAT OR COMBUSTION

BRIEF SUMMARY

The invention is an improvement in method and apparatus of fluidized beds involving heat or combustion by enclosing the fluidized bed chamber within a larger chamber cavity to aid in true rapid start-up then air preheating during operation. The fluidized bed exterior and interior is heated in unicine and allowed to expand in all directions due to a lack of structural confinement. The in bed and above bed heat exchangers usually required to achieve high efficency have been removed and the unit has been scaled down to a small size suitable for residentual and commercial applications without sacrificing high efficency.

BACKGROUND

In conventional fluidized beds, air (or some fluidizing gas) is passed upward through a chamber containing a bed of fine particles at pressure velocity sufficient to force these particles to move and tumble inside the chamber resembling the boiling action of a liquid, hence the name fluidized bed.

During operation of a fluidized bed used as a combustor or furnace these bed particles are pre-heated to some pre-determined temperature, usually several hundred degrees above the kindling point of the fuel to be used in combustion, then said fuel is introduced or fed into the combustion chamber (or bed) where it is ignited by coming in contact with the bed material and burned with the fluidizing air to release heat. Burning fuel in this manner has shown numerous improvements or advantages in the combustion process in terms of: (1) increased efficiency in capture of available BTUs per pound of fuel; (2) allowing us to burn low quality fuels (high ash fuel) (i.e. by-products from a variety of industrial and agricultural processes); (3) allowing a smaller combustion chamber design per given BTU output; (4) allowing fuel to be burned efficiently at lower temperature which decreases the pollution generated; (5) allowing multi-fuel capability within one furnace design; (6) allowing us to capture by-products of the combustion process and poisons laden in some fuels, in the bed material which has led to the discovery that chemical poisons (i.e. toxic waste) can be burned in a fluidized bed where said poisons are captured and civilized in the bed material. But heretofore fluidized bed combustors and the like are huge cludge or equipment and as yet fluidized bed combustors and the like are still a rarity in our society because of their sophisticated design and apparent anonymity. Therefore, improvements in fluidized beds are a much needed discovery during this time of energy conservation and environmental protection, especially from toxic pollution and waste disposal.

PRIOR ART

I. Start-Up

Of primary concern to the development of fluidized beds involving heat or combustion is a method and apparatus for rapid start-up of the bed. Bringing the mass of solids in the bed up to termperature has proved to be no small problem. At present many methods are employed such as:

(1) Directing a flame down to top of the bed while it is being fluidized as in U.S. Pat. No. 3,996,863.

(2) Directing a flame burner within the bed as in U.S. Pat. No. 2,976,835.

(3) Positioning a burner tube within the bed as in U.S. Pat. No. 3,399,874.

(4) Placing a flame burner under the bed where hot gases become the fluidizing gas as is visualized in U.S. Pat. Nos. 3,196,251, 2,647,738, 2,976,853, 2,997,031, 3,890,935, 3,645,237, 3,884,617. But here care must be taken when introducing the heat because intense heat can cause rapid deterioration of metal or uneven expansion which results in material fatigue, (i.e. cracks and warping of the apparatus).

Thus start-up of a fluidized bed involving heat or combustion has been very slow usually requiring hours.

II. Operation

In an effort to further improve the overall efficiency and decrease the bed height of the apparatus in operation, some designers have taken to preheating incoming fluidized air. Here again several methods and apparatuses are employed such as; scavenging heat in huge heat exchangers usually several times larger then the fluid bed chamber and located in the exhaust region of the fluidized bed that might otherwise accommodate economizers and process heat exchangers. Others have taken heat directly from the fluidized bed in piping or a combination of the two and again utilize valuable bed space that could otherwise accommodate apparatuses used for process heat. And in all the above mentioned prior art significant energy is required to run blowers at high pressure to push fluidizing gas through piping. This can be visualized in U.S. Pat. No. 4,116,005. Some patents mention taking heat from obviously narrow passages at combustion chamber exterior wall but most use these passages to cool fluidized bed exterior wall, or to balance pressure as is visualized in U.S. Pat. Nos. 3,884,617 and 3,648,666 respectively.

BRIEF DESCRIPTION OF DRAWINGS

The Figures are intended for explanation of the invention. Dimensions may vary according to application.

The drawings are in cutaway isometric form. FIG. 1 shows a concave fluidizing gas distributor plate (4) and varying cross sectional area of exterior chamber (5), while

THE INVENTION

Figure 1:
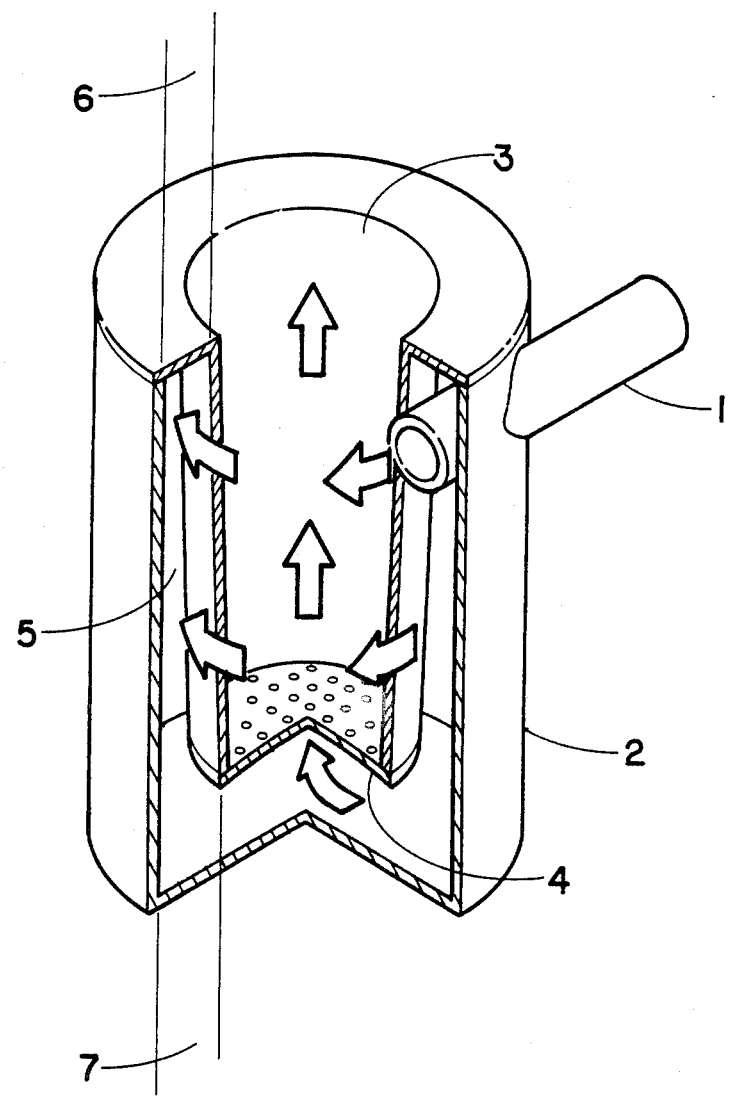
Figure 2:
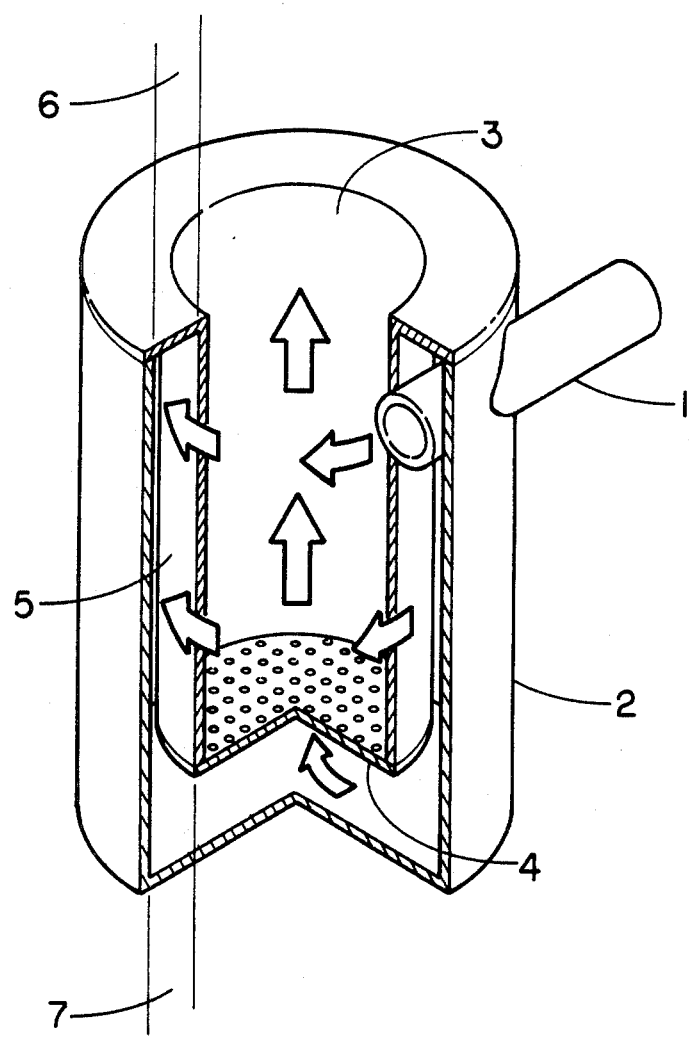
FIG. 2 shows a flat fluidizing gas distributor plate (4) and non-varying cross sectional area of exterior chamber (5) and are described in detail in "The Invention."

The invention is a method and apparatus for drastically improving the start-up and operation of a fluidized bed where heat is required by designing the apparatus where by the Fluidized Bed chamber (3) is supported structurally from the top region above the fluidized bed section there by allowing the sides and bottom to expand un-restricted in movement from thermal expansion. This fluidized bed chamber (3) is then surrounded on sides and bottom by an exterior chamber (2) that is similar to U.S. Pat. No. 3,194,215 FIGS. 1 & 2 no. 1 except that the area between fluidized bed chamber (3) and exterior chamber (2) is greatly increased in are a (5) to be equal to or greater then the cross-sectional area of the fluidized bed chamber (3) begining at top of chamber and extending to bottom. The pre-heat gases indicated by arrows are introduced in the upper portion (1) of the exterior chamber (2) which serves as a plenem for incoming preheat gasses, and work their way down the exterior wall of the fluidized bed chamber (3) to the bottom, then up through the distributor plate (4) which may be concave to allow for expansion (or grid) and up through the bed material fluidizing same and heating each part of fluidized bed exterior and interior in unison.

The method of pre-heating the exterior and interior of the fluid bed in unison has allowed for a significant reduction in time (from hours to minutes) and hence true rapid start-up of a fluidized bed requiring heat without experiencing damage to materials of construction from thermal shock or uneven expansion as is experienced with all prior art when true rapid start-up is attempted.

After start-up is achieved said exterior chamber (2) becomes an air (or fluidizing gas) pre-heater, (where heat is released in chemical reactions or combustion is taking place within the fluid bed chamber), by extracting heat from the fluidized bed exterior wall (3) to pre-heat incoming fluidizing gas (or air) to a temperature more resembling the internal fluidized bed temperature. Explination as cooler air (or fluidizing gas) enters the upper portion (1) of this large exterior chamber (2) it progresses downward at low velocity giving the air longer resistence time because of the increased cross-sectional area of said exterior chamber (2) (as compared to prior art which uses these passages to cool furnace exterior and balance pressure.). Here heat is extracted from fluidized bed chamber exterior wall as incoming gas (or air) reacts with fluidized bed exterior wall (3) at low velocity transferring heat at a much greater rate (than has here-to-for been realized by prior art which moves air at obvious higher velocity in this region becasue of their narrow passageways) and is used to raise the incoming fluidizing gas to a temperature more resembling the internal fluidized bed temperatures. Therefore incoming fluidizing gas does not cool the lower portion of the fluidized bed interior as is evident in prior art. The cross-sectional area of exterior chamber (2) may increase with respect to fluidized bed chamber (3) in the lower portion by tapering chambers (2) and (3) at diferent rates as is dramitized in FIG. 1 vertical dashed lines, note veriation in distance at points (6) and (7), so as to allow for an increas in fluidizing gas temperature with a disporportional increas in volicity. Explaination: As gas heats up it expands in volume. If the area remains constant this would cause an increas in volicity and a loss of heat pick-up. We are not concerned with cooling fluidized bed exterior as is evident in prior art. We are concerned with heating incoming fluidizing air (or gas) to match fluidized bed temperature to promote smoothe chemical reaction in a reduced bed height. Exampels of patents that are similar in design in that they have some sort of chamber in heat exchange relationship to a combustion chamber, but differ greatly for various obvious reasons are; U.S. Pat. Nos. 2,596,610 Re. 23,942, 2,647,738, 2,997,286, 3,194,215, 3,244,220, 3,397,873, 3,399,874, 3,659,559, 3,884,617, 3,910,235, 3,924,402, 3,890,935, 3,648,666, 3,893,426, 4,005,977, and 4,089,119.

This combination of method and apparatus has allowed numerous advantages and a much needed evolutionary step in the development of fluidized beds (involving heat) by;

(1) Allowing a significant reduction in energy and time for start-up of a fluidized bed involving heat or combustion without experiencing problems of thermal shock (cracks and worping) to materials of construction form structural confinement;

(2) Allowing a significant increase in temperature of incoming fluidizing gas over prior art while drastically decreasing the size of the heat exchanger of prior art; and the overall all apparatus reference U.S. Pat. Nos. 4,165,717, and 4,168,670;

(3) Decreasing the energy required to push incoming fluidizing gas through narrow passages in the elaborate heat exchangers, of prior art (Reference U.S. Pat. Nos. 2,997,286, 4,116,005, 4,165,717, 4,168,670, 4,357,907), which increases the efficency of the unit;

(4) Allowing a significant reduction in bed depth which also reduces the energy required to run blowers, without sacrificing high combustion efficiency;

(5) Allowing the fluidized bed and the above bed region to be open to a wide range of industrial processes, because of the removal of in bed and above bed heat exchangers required to pre-heat incoming fluidizing gas (or air). Reference U.S. Pat. No. 4,168,670.

(6) Allowing the fluidized bed apparatus to be scaled down to a small size without sacrificing the high efficiency or multi-fuel capability of industrial size units.

(7) Providing a method and apparatus for improving the complicated process of fluidized beds involving combustion of a variety of low quality fuels and for detoxifying chemical pollutants, poisons, and the like as well as providing improvment for a variety of chemical reactions by civilizing them in a simplified, smaller, and more practical apparatus, all in all allowing a simple and more practical design constructed from fewer materials and at an obviously decreased construction or fabrication cost which will make for a more affordable unit to the market and thus providing a much needed evolutionary step in solving problems of energy conservation and environmental protection.

What I claim as my invention, and desire to secure by letter of patent is:

1. An improvement in the apparatus of a fluidized bed involving heat or combustion, where the fluidized bed is contained in an inner chamber having heat conducting walls for containing bed particles on all sides, a bottom plate for supporting bed material provided with a means for passing fluidized gases through said bottom, an exterior chamber surrounding said interior fluid bed chamber on sides and bottom having a cross sectional area equivalent to or greater than the cross sectional area of the fluid bed interior, a means for introducing incoming fluidizing air in the upper portion of the said exterior chamber where incoming gases work their way down the exteror wall of said interior fluidized bed chamber at low velocity for the purpose of equalizing heat, then up through the bottom plate of said interior chamber fluidizing the bed particles.

2. A fluidized bed apparatus according to claim 1 where the bed chamber is supported predominantly from one region and allowed to expand in all directions during rapid start-up from heat.

3. A fluidized bed apparatus according to claim 1 where the bottom plate for passing fluidizing gases into the bed chamber is concave along the horizontal plain to compensate for expansion.

4. A fluidized bed apparatus according to claim 1 where the bed chamber walls are parallel or may vary in distance of separation along the vertical plain.

5. A fluidized bed apparatus according to claim 1 where fins or vanes are attached to fluid bed chamber exterior wall for the purpose of directing fluidizing gas in a swirling action along chamber exterior wall prior to its entering the fluid bed chamber.

6. A fluidized bed apparatus according to claim 1 having a separate chamber surrounding the fluid bed chamber walls and bottom exterior and having a cross-sectional area equal to or greater than the cross-sectional area of the fluid bed chamber interior and being open in the upper portion for receiving incoming fluidizing gas.

7. An exterior chamber according to claim 6 where the lower portion of said chamber may vary in cross-sectional area from the upper portion of said exterior chamber to allow for an increase in fluidizing gas volume with a disportional increase in velocity.

8. An improvement in the method of a fluidized bed involving heat or combustion, where the fluidized bed is contained in an inner chamber having heat conducting walls for containing bed particles on the sides, a bottom plate for supporting bed matrial and for passing fluidizing gasses to the bed particles all forming an interior fluid bed chamber surrounded by an exterior chamber on sides and bottom and having a cross sectional area equivalent to or greater than the cross sectional area of the fluid bed interior, and having an opening for introducing incoming gasses in the upper portion of the said extorior chamber where incoming gases work their way down the exterior wall of said interior fluidized bed chamber for the purpose of exchanging heat, then up through the bottom plate of said interior chamber fluidizing the bed particles and providing the method of heating or exchanging heat with the exterior and interior of the fluidized bed chamber in unison.

* * * * *